US012526266B2

(12) United States Patent
Tanwar et al.

(10) Patent No.: US 12,526,266 B2
(45) Date of Patent: Jan. 13, 2026

(54) AUTHENTICATION OF A POWER OVER ETHERNET DEVICE (71) Applicant: CISCO TECHNOLOGY, INC., San Jose, CA (US)

(72) Inventors: Anshul Tanwar, Bangalore (IN); Kumaril Kapoor, Bangalore (IN); Praveen G R, Bangalore (IN); Padmanabhan Ramanujam, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 18/674,195

(22) Filed: May 24, 2024

(65) Prior Publication Data
US 2025/0365273 A1 Nov. 27, 2025

(51) Int. Cl.
*H04L 9/40* (2022.01)
*G06F 1/26* (2006.01)

(52) U.S. Cl.
CPC ............... *H04L 63/08* (2013.01); *G06F 1/26* (2013.01)

(58) Field of Classification Search
CPC .................................. H04L 63/08; G06F 1/26
See application file for complete search history.

(56) References Cited

U.S. PATENT DOCUMENTS

| 8,656,192 | B2* | 2/2014 | Lee ......................... G06F 1/266 713/300 |
| 9,489,543 | B2* | 11/2016 | Jinaraj ..................... G06F 1/266 |
| 9,703,338 | B1* | 7/2017 | Nachum ................. G06F 1/266 |
| 10,416,202 | B1 | 9/2019 | Contario et al. |
| 2008/0256598 | A1* | 10/2008 | Diab ....................... H04L 63/08 726/2 |
| 2010/0199113 | A1* | 8/2010 | Lee ......................... G06F 1/266 713/300 |
| 2013/0227306 | A1 | 8/2013 | Santos et al. |
| 2015/0312048 | A1 | 10/2015 | Bodo et al. |

\* cited by examiner

*Primary Examiner* — Bryan Y Lee
(74) *Attorney, Agent, or Firm* — Burris Law, PLLC (57) ABSTRACT

In one embodiment, a method includes receiving a request from a powered device for power to be supplied from power sourcing equipment to the powered device; granting, in response to the request, provisional power to the powered device; receiving, an authentication request from the powered device to authenticate the powered device and reserve power; analyzing user data and device data to determine an authentication status for the powered device; denying power within a power budget for the powered device in response to the analyzing determining that the authentication status for the powered device corresponds to a failed authentication; and using an authenticated-power-profile to determine one or more actions to be performed with respect to the powered device having the failed authentication, in response to a defined number of failed authentications or an expiration of a timeout period defining an amount of time allowed to authenticate the powered device.

20 Claims, 5 Drawing Sheets

| Field | Details |
|---|---|
| Number of Retries | The number of failed-authentication attempts based on which the authenticated-power-profile gets applied. |
| Timeout (minutes) | The time (e.g., in minutes) allowed for the port to get authenticated post first authentication failure, before the authenticated-power-profile gets applied. |
| Power Action | Defines one of the actions that can be taken by this profile:<br>• No Action: Do not take any action.<br>• Send Power-Deny for X-seconds: PSE sends power deny and does not consider further requests from PD for a defined time (e.g., number of seconds configurable via an administrator)<br>• Mark PD to send power-deny: PSE allows power but marks PD and can send power-deny in case PSE runs out of power-budget later point in time, in order to allow power to right authenticated PDs. |
| Should this be budgeted in overall power budget of the device. | Access power budget and determine available power. |
| Dynamic Actions | Dynamic power control. |
| Priorities for the Devices | Based on device classification or priority or class, take defined actions. |

AUTHENTICATION OF A POWER OVER ETHERNET DEVICE

FIELD

The present disclosure relates to Power over Ethernet (POE) devices and more particularly to authentication of the PoE devices.

BACKGROUND

PoE allows for the delivery of power from power sourcing equipment (PSE) to powered devices (PDs) through Ethernet cabling. For example, network switches and hubs can deliver power to wireless access points, Internet Protocol (IP) devices, other IEEE-compliant devices, etc. over the Ethernet cabling. The PDs typically receive an initial amount of power to allow the PDs to power up and negotiate PoE power needs. However, after additional power is provided to the PDs, even non-authenticated PDs remain powered up, thereby reducing the amount of available power for other PDs.

Accordingly, it is desirable to provide improved methods and systems for authenticating PDs to prevent non-authenticated devices from consuming power. Furthermore, other desirable features and characteristics of the present disclosure will become apparent from the subsequent detailed description and the appended claims, taken in conjunction with the accompanying drawings and the foregoing technical field and background.

DRAWINGS

In order that the disclosure may be well understood, there will now be described various forms thereof, given by way of example, reference being made to the accompanying drawings, in which.

DESCRIPTION OF EXAMPLE EMBODIMENTS

The following description is merely exemplary in nature and is not intended to limit the present disclosure, application, or uses. It should be understood that throughout the drawings, corresponding reference numerals indicate like or corresponding parts and features. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Overview

According to various embodiments, systems, methods, and computer program products are provided for authenticating and managing power supplied to PDs, such as authenticating PDs to allow continued power usage by the PDs. A method includes receiving, by a processor at a network device, a request from a powered device for power to be supplied from power sourcing equipment to the powered device; granting, by the processor at the network device, in response to the request, provisional power to the powered device, wherein the provisional power grant does not result in a power reservation within a power budget of the power sourcing equipment; receiving, by the processor at the network device, an authentication request from the powered device to authenticate the powered device and reserve power within the power budget of the power sourcing equipment; analyzing, by the processor at the network device, user data and device data to determine an authentication status for the powered device; denying power within the power budget for the powered device, by the processor at the network device, in response to the analyzing determining that the authentication status for the powered device corresponds to a failed authentication; and using, by the processor at the network device, an authenticated-power-profile to determine one or more actions to be performed with respect to the powered device having the failed authentication, in response to a defined number of failed authentications or an expiration of a timeout period defining an amount of time allowed to authenticate the powered device, wherein the one or more actions include a power deny for a defined power deny period or a revocable power grant that results in power being reserved for the powered device until the power budget exceeds a maximum power supply limit for the power sourcing equipment.

EXAMPLE EMBODIMENTS

Figure 1:
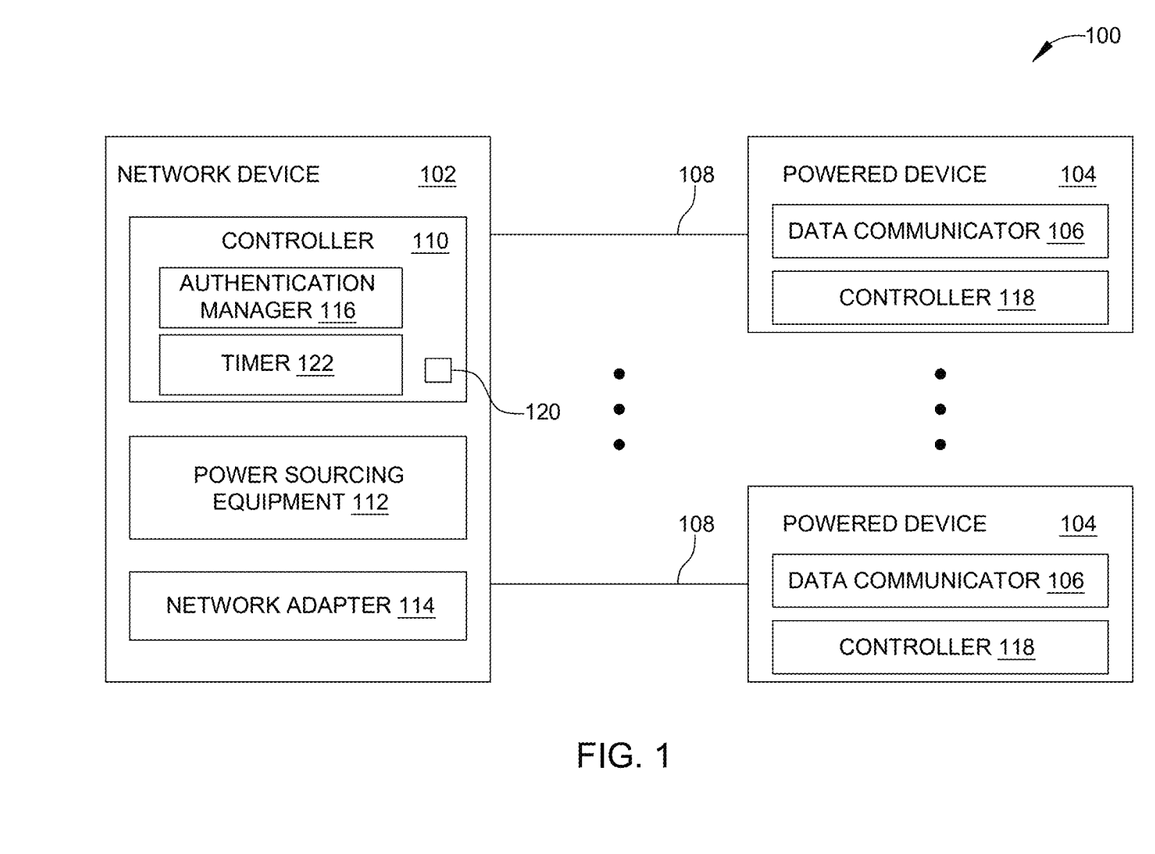
FIG. 1 is a block diagram of a PoE system providing device authentication in accordance with various embodiments.

With reference to FIG. 1, a PoE system 100 is illustrated that in one or more embodiments includes a network device 102, such as a POE switch, and powered devices (PDs) 104. As shown, the network device 102 is coupled to the plurality of PDs 104, each of which represents any type of device capable of receiving DC power using PoE. For example, the PDs 104 may be consumer products (e.g., IP phone or IP camera), environmental controls, electronic devices (e.g., LED bulb or PoE powered light), and the like. The PDs 104 each include a data communicator 106 that enables data communication via communication links, illustrated as Ethernet cables 108. That is, in one or more embodiments, the network device 102 enables the PDs 104 to communicate with a network (e.g., the Internet) as well as provide power to the PDs 104 though one or more Ethernet ports. Using the data communicators 106, the PDs 104 can receive data packets from, as well as transmit data packets to, the network device 102, while also being supplied power.

In some embodiments, the PoE system 100 is part of, for example, the Internet of Everything (IoE) or the Internet of Things (IoT). For example, the PD 104 may be an IP or IoT device in a home or office. The network device 102 may include an application that turns the device on and off, with the power remaining on until turned off by a user. The PD

104, however, can be any type of device, such as any type of IoT device, for example a home security camera (e.g., IP camera), etc.

Although FIG. 1 illustrates that the network device 102 and PDs 104 are transmitting data messages over the Ethernet cables 108, in some embodiments the network device 102 may provide only power to the PDs 104 using PoE. Further, instead of the network device 102 (e.g., a router, switch, etc.), another device may be used to provide DC power and forward data packets to the PDs 104.

The network device 102 further includes a controller 110, power sourcing equipment (PSE) 112, and a network adapter 114. The controller 110 in some examples may be or include any operating system (OS) capable of performing the functions described herein, such as to authenticate the PDs 104 using a combination of user authentication (e.g., user password authentication) and device authentication (e.g., MAC address authentication) to allow the PDs to continue receiving power from the PSE 112. The controller 110 may also establish a data plane for forwarding data between devices connected to the network device 102. The controller 110 may maintain a control plane to manage the flow of the data traffic in the data plane.

In various embodiments, the controller 110 includes an authentication manager 116 for performing authentication functions in some examples. For example, the authentication manager 116 may perform one or more PoE authentication functions post PoE negotiation (initial power supply negotiation) to confirm that the PD 104 is authenticated to continue receiving power from the PSE 112 and uses an authenticated-power-profile 210 (see FIGS. 2 and 3) in the event authentication fails to determine whether power is to be maintained to the PD 104 from the PSE 112. That is, once the PD 104 is granted power (e.g., an initial power grant), a Port Based Authentication Control, for example 802.1x or Mac Authentication Bypass is used, and if the authentication is successful, then power is considered 'reserved' for the PD 104 in various embodiments; and if authentication fails, the authenticated-power-profile 210 is used to determine power control to the PD 104 that failed authentication. Thus, in various embodiments, the network device 102 is configured as a POE switch to control the power availability to satisfy the power requirements of authenticated PDs 104 and non-authenticated PDs 104 (e.g., determine whether power is to be supplied to any non-authenticated PDs 104). It should be noted that in some embodiments, the power control is performed using any type of controller having the authentication manager 116.

The PSE 112 in some examples includes a physical power supply that is controlled at least in part by the authentication manager 116 to authenticate PDs 104 in order to deliver power to the PDs 104. The PSE 112 may include an AC-DC converter that converts the AC power into DC power. As shown, the PSE 112 provides DC power to each of the PDs via the Ethernet cables 108. However, power applications are contemplated within the PoE system 100 in one or more embodiments, wherein the PDs 104 are associated with one or more access points. The PSE 112 may include circuitry for monitoring the power drawn by each of the PDs 104 to ensure the PDs 104 do not draw more power than the PDs 104 are authorized to draw. The power supply (or supplies) in the PSE 112 may have a maximum total power capacity (e.g., a total power budget) that can be authorized for use by the authentication manager 116 to supply from the PSE 112 to the PDs 104. In addition to this total power limitation, a per PD power limit may be enforced. That is, the PSE 112 may provide up to a maximum power supply to any one of the PDs 104, such as based on different criteria as described in more detail herein. For example, the authentication manager 116 may be configured to vary power to the PDs 104 based on different criteria.

As discussed below, the PDs 104 and the authentication manager 116 can use authentication information and the authenticated-power-profile 210 to control the power supplied to the PDs 104. For example, if an initial predefined power is supplied to one or more of the PDs 104, once powered on, the authentication manager 116 is configured to identify PDs 104 to have full power continued to be maintained thereto (full power profile). This authenticated power control allows for an improved available power budget of the PSE 112 across the total number of PDs 104 that can be powered by the PSE 112 in various examples.

In addition to providing power on the Ethernet cables 108, the network adapter 114 may transmit and receive data signals on the Ethernet cables 108, such as authentication data. Thus, the network device 102 may mix the data signal with power signals in order to simultaneously deliver power and data messages to and from the PDs 104 using the cables 108. However, in other embodiments, the cables 108 may be used to deliver only power, but not data, to the PDs 104. In some embodiments, network data is sent over one set of wires within the cable 108 and power is sent over a separate set of wires within the cable 108.

In one or more embodiments, the authentication manager 116 may improve operations performed using one of the PoE functions in combination with a higher layer authentication (e.g., 802.1x authentication) to manage the power budget (e.g., overall available power) of the PSE 112. For example, the authentication manager 116 in various embodiments allows a network level power determination based on device authentication. That is, in one or mor embodiments, the authentication manager 116 uses the authenticated-power-profile 210 as described in more detail herein that allows dynamic control of power to the PDs 104, thereby allowing dynamic changes to the power budget for the PSE 112. As a result, in various embodiments, the power budget is managed and not limited, such as based on a first come, first reserve mode of operation, and accordingly, certain types of power usage are limited or prevented (e.g., distributed-denial-of-power-attacks). That is, in various embodiments, the PSE 112 provides additional or enhanced authentication of IEEE-compliant PD requests and grants power based on consideration of the higher layer authentication (such as 802.1x authentication) results. As such, validation is extended or improved over a basic validation of the PD 104 in order to get connected to the PoE system 100 and maintain power thereto.

In one or more embodiments, each of the PDs 104 includes a controller 118 that receives and processes network data signals from the network adapter 114. The controller 118 also sends signals to the network device 102, such as authentication data as described in more detail herein. For example, the controller 118 communicates with the controller 110 to provide both authentication for maintaining power from the PSE 112 and authentication to send data traffic. Based on the authentication data, the PD 104 can have power reserved or denied in various examples, such as based on the authenticated-power-profile 210 as described in more detail herein. The authentication manager 116 thereby allows for dynamic management and/or control of power supply to the PDs 104. It should be noted that each of the PDs 104 may have one or more operational features, such as facilitating different features or operations (e.g., telephony or video operations) in some examples.

The controller 110 and/or the controller 118, as well as other components of the PoE system 100 can include one or more processors or computing devices. The processors or computing device may be implemented using any suitable processing system, such as one or more processors, controllers, microprocessors, microcontrollers, processing cores and/or other computing resources spread across any number of distributed or integrated systems, including any number of "cloud-based" or other virtual systems. In various embodiments, computer-executable programming instructions are provided that, when read and executed by the controller 110, 118, cause the controller 110, 118 to perform authentication and power management and/or power control for PoE as described in more detail herein.

The operating system in some examples includes computer-executable programming instructions, when read and executed by the processor, cause the processor to operate the server system's basic functions such as scheduling tasks, executing applications, memory allocation, and controlling the input/output devices. The input/output devices generally represents the interface(s) to networks (e.g., any other local area, wide area, or other network), mass storage, display devices, data entry devices, and/or the like.

In one or more examples, the network device 102 further includes memory 120 that stores data for authentication and power control as described in more detail herein. For example, the memory 120 stores device authentication data, user authentication data, and one or more authenticated-power-profiles 210 as described in more detail herein. It should be noted that the memory 120, while shown as part of the controller, may form part of other components or devices, such as the authentication manager 116 and the controller 118, among others. Additionally, the memory 120 can include multiple memory devices provided in connection with one or more of the components of the PoE system 100.

It is to be appreciated that the memory 120 (e.g., a data store) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The memory 120 of the subject systems and methods is intended to comprise, without being limited to, these and any other suitable types of memory. In addition, it is to be appreciated that the memory 120 can be a server, a database, a hard drive, and the like.

The memory 120 in various example represents any non-transitory short- or long-term storage or other computer-readable media capable of storing programming instructions for execution on the processor, including any sort of random access memory (RAM), read only memory (ROM), flash memory, magnetic or optical mass storage, and/or the like. In various embodiments, the memory 120 includes databases that store data for use as described herein. As can be appreciated, the memory 120 represents one suitable implementation of such computer-readable media, and alternatively or additionally, the controller 110, 118 can receive and cooperate with external computer-readable media that is realized as a portable or mobile component or application platform, e.g., a portable hard drive, a USB flash drive, an optical disc, or the like.

Figure 2:
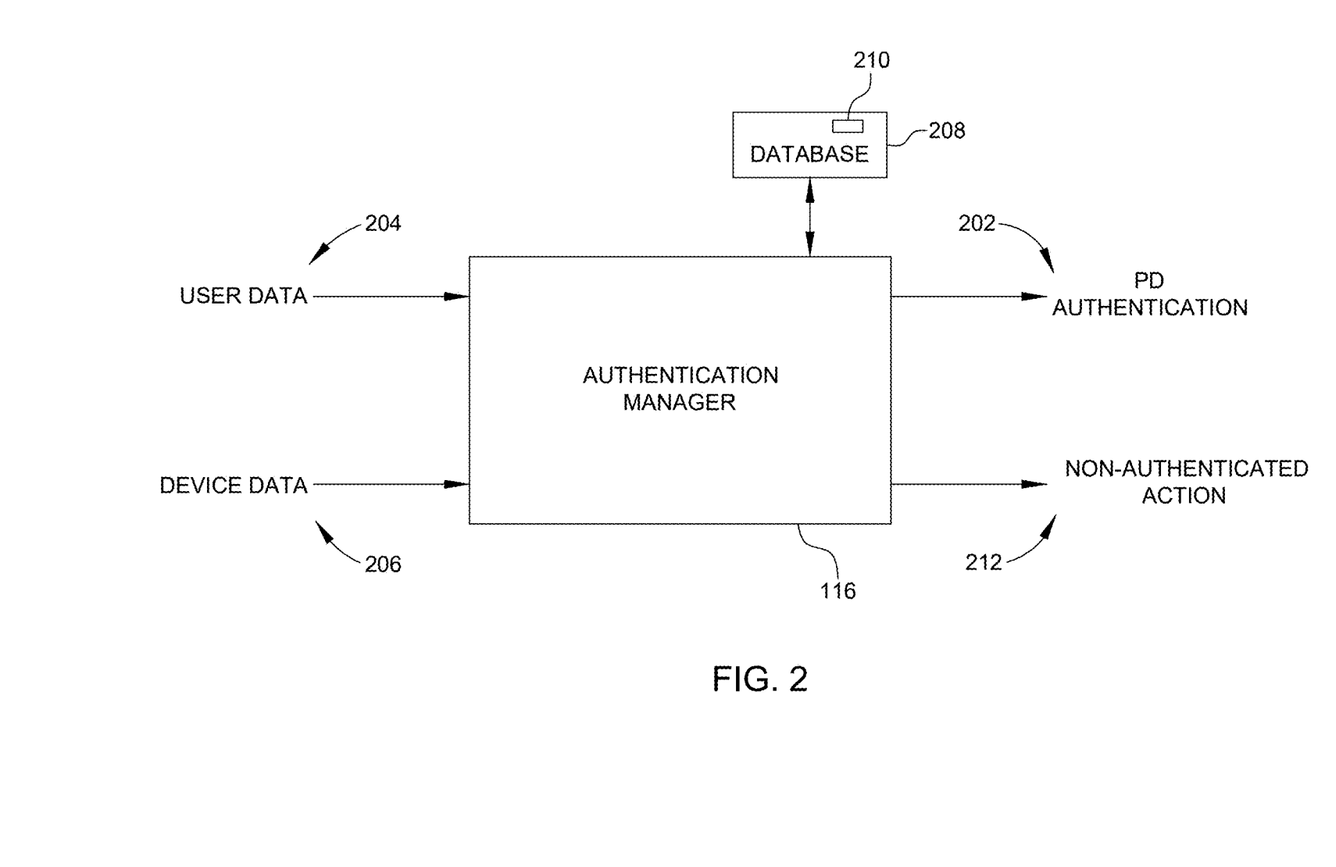
FIG. 2 is a block diagram illustrating an authentication manager in accordance with various embodiments.

With reference now also to FIG. 2, the authentication manager 116 in some examples is configured as a user and device authenticator that provides improved power budget management. In operation, in one or more embodiments, in response to power being granted to the PD 104 (post PoE negotiation), the PD 104 is considered to be in an 'in-process' state if the Ethernet port has any form of authentication enabled. Once the power is granted to the PD 104, in various embodiments, the Port Based Authentication Control, for example 802.1x or Mac Authentication Bypass is initiated as described herein, and based on a successful authentication, which includes user and device authentication, the PD 104 is then in an authenticated state and power is considered 'reserved' for the PD 104. In various embodiments, in response to confirmation that the PD 104 is user authenticated and can transmit data and device authenticated and can be powered, the PD 104 is successfully authenticated on the Ethernet port. That is, the PD 104 is thereby capable of communicating over the Ethernet cable 108 and receiving power from the PSE 112 (power is 'reserved' for the authenticated PD 104). In some examples, the authentication manager 116 outputs to the PSE 112, a PD authentication signal 202, indicating the confirmation and that the PSE 112 is to reserve power for the authenticated PD 104. It should be noted that the controller 110, including one or more components thereof, can form part of the PSE 112 in some examples.

Thus, the authentication of the PD 104 performed in various embodiments uses both user data 204 and device data 206 to authenticate the PD 104 and allow data and power capabilities. If the authentication manager 116 is unable to authenticate the PD 104 based on the user data 204 and/or the device data 206, in one or more embodiments, the authentication manager 116 accesses a database 208 that includes one or more of the authenticated-power-profiles 210 (see also FIG. 3) used to determine one or more actions to be performed with respect to the non-authenticated PD 104, which is output as a non-authenticated action signal 212. That is, the authenticated-power-profile(s) are used when the PD 104 fails the appropriate mode of authentication based on higher layer protocols, which allows for better management of the overall power budget (power allocation) for the PSE 112.

The authentication manager 116 performs or implements one or more processes as described herein. For example, the authentication manager 116 in various examples is configured as an authentication analyzer that analyzes the user data 204 and the device data 206 to authenticate the PDs 104, as well as determine further actions to be performed for non-authenticated PDs 104. In operation, the authentication manager 116 is configured to receive one or more inputs, including for example, the user data 204 and the device data 206, as well as other user and device information, which can be any inputs that are useful or that can affect the authentication process (e.g., to confirm the user authenticated data and device authenticated data). Additionally, one or more variables, criteria, etc. can be inputs to the authentication manager 116. In some examples, one or more user interfaces facilitate the authentication process.

In various embodiments, the authentication manager 116 processes the inputs and confirms authentication of the PD 104 and/or determines actions to be taken with respect to a non-authenticated PD 104. The inputs can include different types of data that the authentication manager 116 analyzes to identify potential actions, which can be varied based on the authenticated-power-profile(s) 210. In some examples, the database 208 (e.g., a database of potential actions to be taken, past actions taken, etc.) is updated (such as using artificial intelligence or machine learning) to increase the likelihood that power from the PSE 112 is reserved for 'good-actor' or 'good-citizen' PDs 104. For example, the database 208 in some embodiments is a dynamic database that is periodically or continuously updated based on the analysis of various inputs, PDs 104 currently consuming power, PDs 104 previously consuming power, etc. It should be noted that the authentication manager 116 is operable at different points of the authentication process, power reservation process, power granting process, etc.

In some examples, the outputs of the authentication manager 116 are provided to the PSE 112 or other power supply or control devices to actively and/or dynamically control power at Ethernet ports of the PoE system 100. That is, using the authenticated-power-profile(s) 210, flexible power control for management of the power budget (e.g., total available power) is improved. In some embodiments, using the authentication manager 116, an overall strategy or control arrangement for power management improves the available power from the PSE 112. For example, authenticated PDs 104 have available power from the PSE 112 reserved, while non-authenticated PDs 104 (e.g., user authentication fails) have a provisional power status, wherein available power is determined based on additional steps or operations using the authenticated-power-profile(s) 210 (e.g., different parameters, criteria, etc.). As a result, the non-authenticated PDs 104 may still be granted power, but during the enhanced authentication process using the authenticated-power-profile(s) 210, any power for the non-authenticated PDs 104 is provisionally reserved, in some examples, such that the provisional reservation does not affect the overall power budget (e.g., does not reduce the power available to the authenticated PDs 104). A more optimized power budget is thereby provided with a greater likelihood that power is available to PDs 104 that have a legitimate use for the power.

Figure 3:
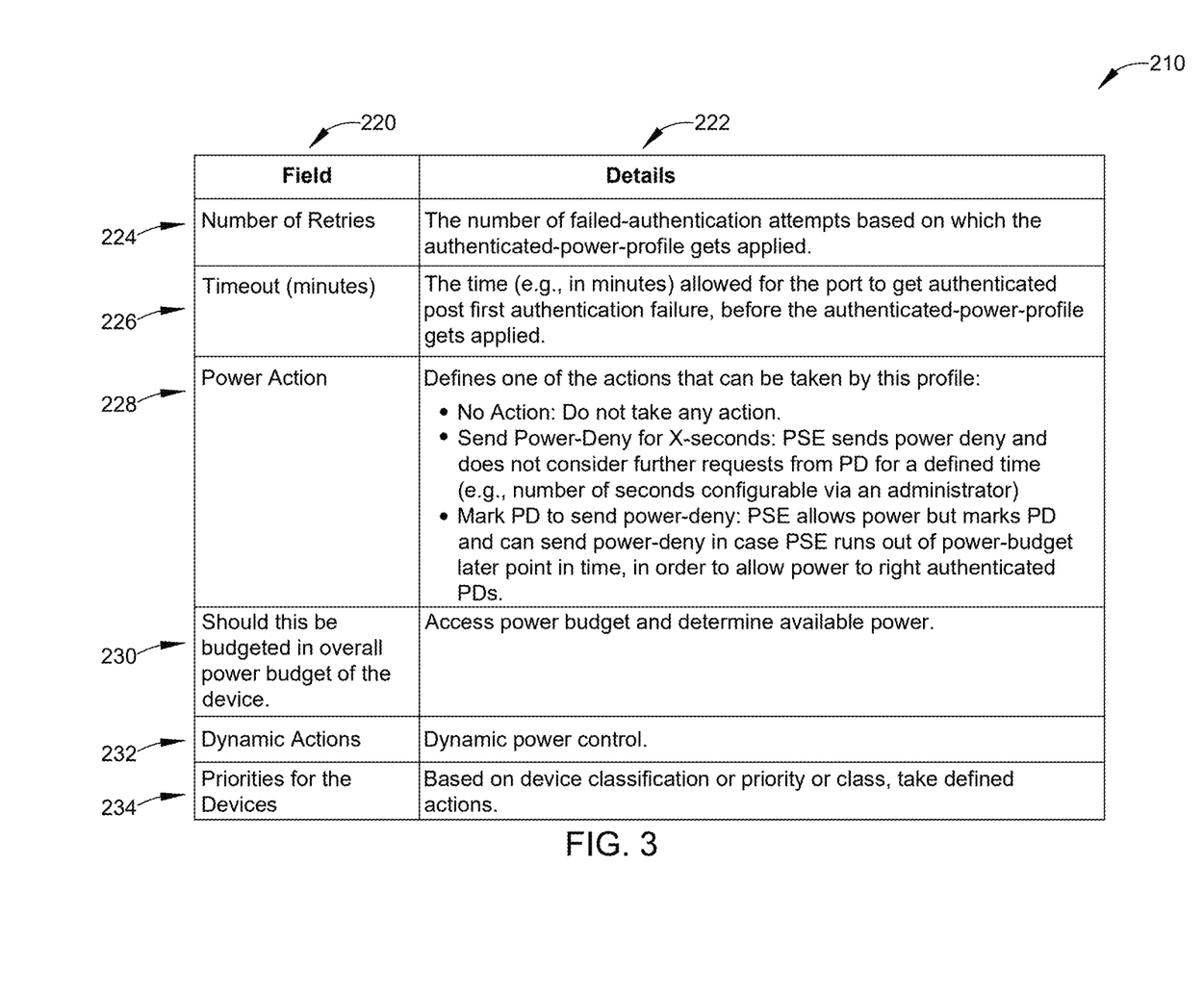
FIG. 3 is a table illustrating an authenticated-power-profile in accordance with various embodiments.

As can be seen in FIG. 3 showing an example authenticated-power-profile 210, fields 220 (e.g., configurable criteria fields) relating to different parameters or criteria are associated with actions 222 to be taken with respect to non-authenticated PDs 104. That is, in response to a determination that the PD 104 is not authenticated, such as being a recognized or compliant device (device authenticated based on the device data 206), but not being user authenticated (based on the user data 204), one of more of the fields 220 are used by the authentication manager 116 to analyze the non-authenticated PDs 104 and corresponding actions(s) 222 to be taken with respect to the non-authenticated PDs 104. In this example, the authenticated-power-profile 210 is arranged as a table that can be flexibly or dynamically adjusted to maintain an efficient power management structure and which can be used to determine when the authenticated-power-profile 210 is initiated and the actions 222 to be taken.

In the illustrated example, the authenticated-power-profile 210 is initiated based on a number of retries (field 224) to authenticate the PD 104, such as unsuccessful attempts at authentication (e.g., a number of failed authentication attempts). That is, the number of retries (field 224) in some examples defines as an associated action 222, such as a threshold value of authentication attempts for applying the authenticated-power-profile 210 and/or withdrawing the provisional reservation of power from an already non-authorized PD 104, or performing further actions as described in more detail herein. In some examples, the fields 220 (e.g., enhanced authentication criteria) include a timeout period field 226 that defines as an associated action 222, a time (e.g., in minutes) for the Ethernet port to be authenticated by the PD 104 after the first authentication failure and before the authenticated-power-profile 210 is applied. That is, in some examples, a threshold timeout period is defined, after which, the authenticated-power-profile 210 is applied, and further actions performed as described in more detail herein. As such, the fields 224 and 226 in one or more embodiments define criteria for the initiation of the authenticated-power-profile 210 by the authentication manager 116.

In response to the one or more of the fields 224, 226 being satisfied, power actions 228 are applied that define one or more further actions (or non-actions) to be taken and which can be communicated using the non-authenticated action signal 212. For example, no action can be taken, such as if the PSE 112 has unused or available power; a power-deny can be sent as the non-authenticated action signal 212; or a delayed power deny can be sent as the non-authenticated action signal 212. In some embodiments, the power-deny prevents the PD 104 from being supplied power by the PSE 112 for a defined time period (e.g., defined number of seconds or minutes that is configurable), such that further requests from the PD 104 are not considered during this time period. It should be noted that during this time period, in response to any further requests from the non-authorized PD 104, the PSE 112 sends a power deny and does not consider requests or allow power to be supplied to the non-authorized PD 104 until after the expiration of the defined time period. In some embodiments, the delayed power-deny allows power to be supplied to the non-authorized PD 104, but marks or identifies the non-authorized PD 104 as having provisional power (e.g., conditional power based on future power demands or requirements). That is, in response to the PSE 112 reaching a maximum power supplied for the power supply budget, the PSE 112 sends the power-deny to the PD 104 to make the power currently supplied to the PD 104 available to other PDs 104 (e.g., newly authorized PDs 104).

In some embodiments, a budget field 230 is provided that is used to determine whether the power requested by the non-authorized PD 104 is to be budgeted in the overall power budget. For example, as described herein, the corresponding action 222 (based on accessing the current power budget usage and available power) determines whether a power deny is to be issued, a provisional power grant is to be issued, etc. In some examples, dynamic actions 232 can be taken to provide dynamic power control. For example, one or more dynamic actions are taken based on changes to the power budget (e.g., denying power, reducing power, etc. to PDs 104). In some examples, a priority field 234 can be used to identify the priority status of the PD 104. This field 234 defines the actions 222 to be taken based on, for example, the classification or priority or class of the PD 104, such that higher priority devices are more likely to receive requested power than lower priority devices.

Thus, the authenticated-power-profile 210 allows the PSE 112 to take actions with respect to a non-authorized PD 104 that are different than for an authorized PD 104, such as based on configurations that are defined by network administrator(s). In operation, the authentication manager 116 can use the authenticated-power-profile 210 to reduce the depletion of the available power and prevent or reduce the likelihood of a distributed-denial-of-power-attacks.

Figure 4:
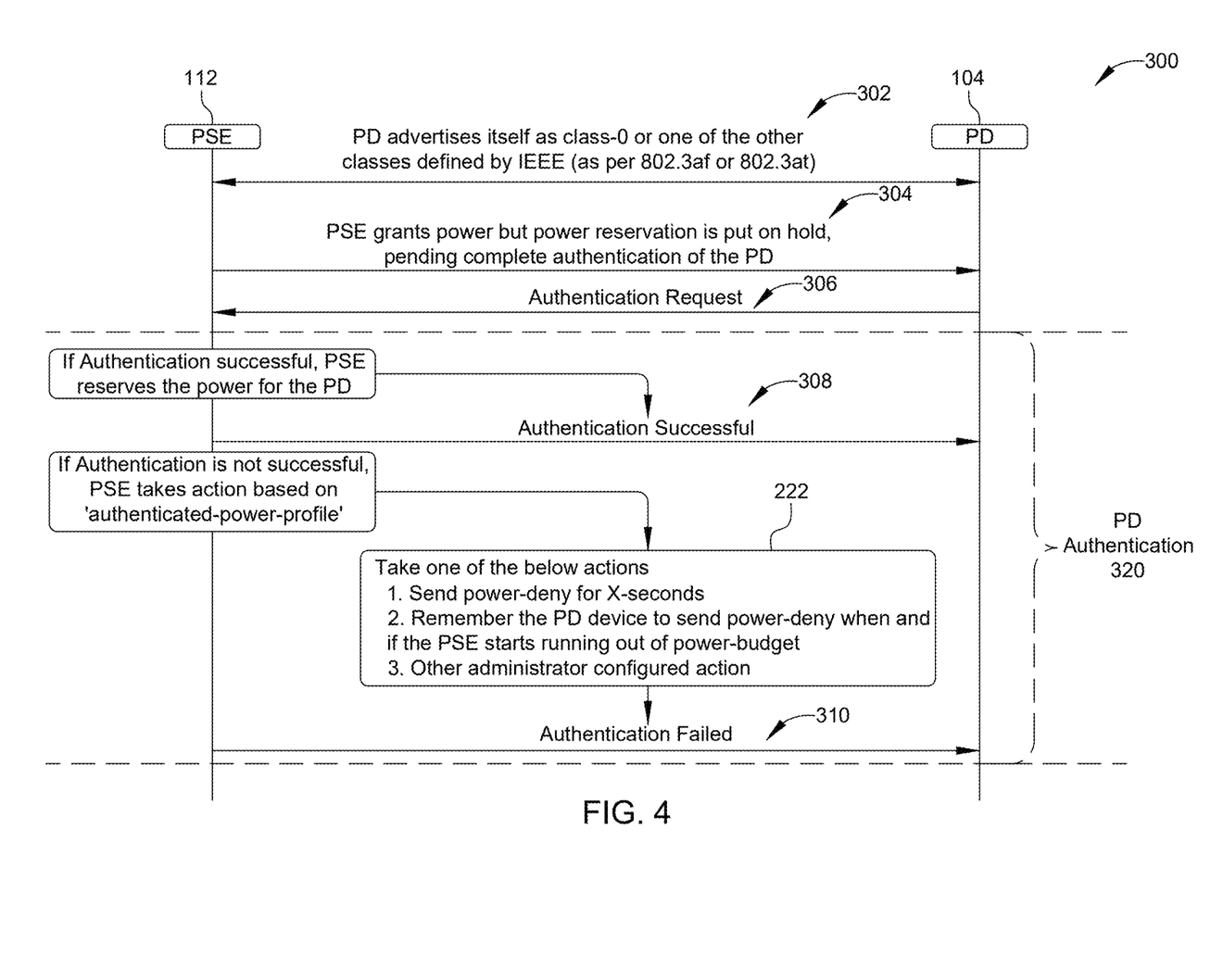
FIG. 4 is a diagram illustrating a process flow for authenticating and controlling power supplied to a device in accordance with various embodiments.

FIG. 4 illustrates a process flow 300 of an example for authenticating and controlling power to be supplied to the PD from the PSE 112. In this example, the PD 104 identifies as a compliant device by transmitting a device class identifier signal 302. That is, the PD 104 'advertises' itself as a class-0 or another IEEE defined class device (e.g., 802.3af or 802.3at class device) and, in response, the PSE 112 sends a grant power signal 304 to the PD 104. In various embodiments, the power that is granted by the PSE 112 to the PD 104 is initially allocated as reserved power that is on 'hold' until a complete authentication of the PD 104 is performed. As such, power is provisionally allocated to the PD 104 (on 'hold') in order to perform PD authentication. This provisional allocation or reservation of power does not reduce the amount of overall available power from the PSE 112 (i.e., does not reduce the power budget). In some examples, when the PD 104 (e.g., PoE PD device, such as an IP phone) is connected to the Ethernet port, such that the PSE 112 provides initial power (according to the IEEE), the authentication manager 116 starts a timer 122 (that is configurable) to wait for the PD 104 to be authenticated. That is, a PD authentication process 320 is performed to authenticate the PD 104. In some embodiments, failure of the PD 104 to be authenticated within the time period defined by the configurable timer 122 results in an authentication failure.

The PD 104 then requests authentication with an authentication request signal 306, which results in initiation of the PD authentication process 320 in accordance with various embodiments, and which includes enhanced authentication as described in more detail herein. In particular, in response to user and device authentication being successfully performed for the PD 104 requesting the power as described in more detail herein, the PSE 112 reserves power (from the overall power budget or resource) and transmits an authentication successful signal 308 to the PD 104. For example, in response to the authentication manager 116 authenticating the user data 204 (e.g., username and password, two factor authentication, etc.) and the device data 206 (e.g., MAC address authentication), the authentication successful signal 308 is sent.

In response to an unsuccessful authentication, such as a failure to user authenticate (e.g., IP phone is connected, but not logged in), the PSE 112 transmits an authentication failed signal 310 to the PD 104. In some embodiments, the authentication manager 116 then uses the authenticated-power-profile 210 to determine one or more actions 222 to be performed as described in more detail herein in response to the PD 104 not being authenticated. It should be appreciated that the actions 222 can be varied as desired or needed using different or dynamic authenticated-power-profiles 210.

Thus, in various embodiments, in response to the PD 104 being authenticated, a notification is provided to the PSE 112 and the power granted temporarily is then reserved against the Ethernet port. In response to the PD 104 failing authentication, or the timer 122 expires, notification of the failure is provided to the PSE 112 and the PSE 112 sets the port to error-disabled and releases the power budget to be available for other ports, and other PDs 104. The criteria for authentication failure is configurable based on the authenticated-power-profile 210 in various embodiments, such as to prevent distributed-denial-of-power-attacks (e.g., to protect a limited power budget of the PSE 112). As such, when the PD 104 fails authentication, such as user authentication, including the enhanced authentication described herein, the PD 104 cannot be part of the PoE system 100 (e.g., the PD 104 is not user authenticated and therefore cannot transmit data) and hence one or more embodiments prevent power from being supplied to the PD 104 (e.g., prevent the PD 104 from reserving power from the PSE 112). For example, PoE power is granted in response to a PD request but is 'provisional' and reserved only post PD authentication within the timeout period. This provisional power reservation is temporary and is not part of the actual power budget, which defines the ceiling of the power for "all" (good or bad) citizens of the PD categories.

Figure 5:
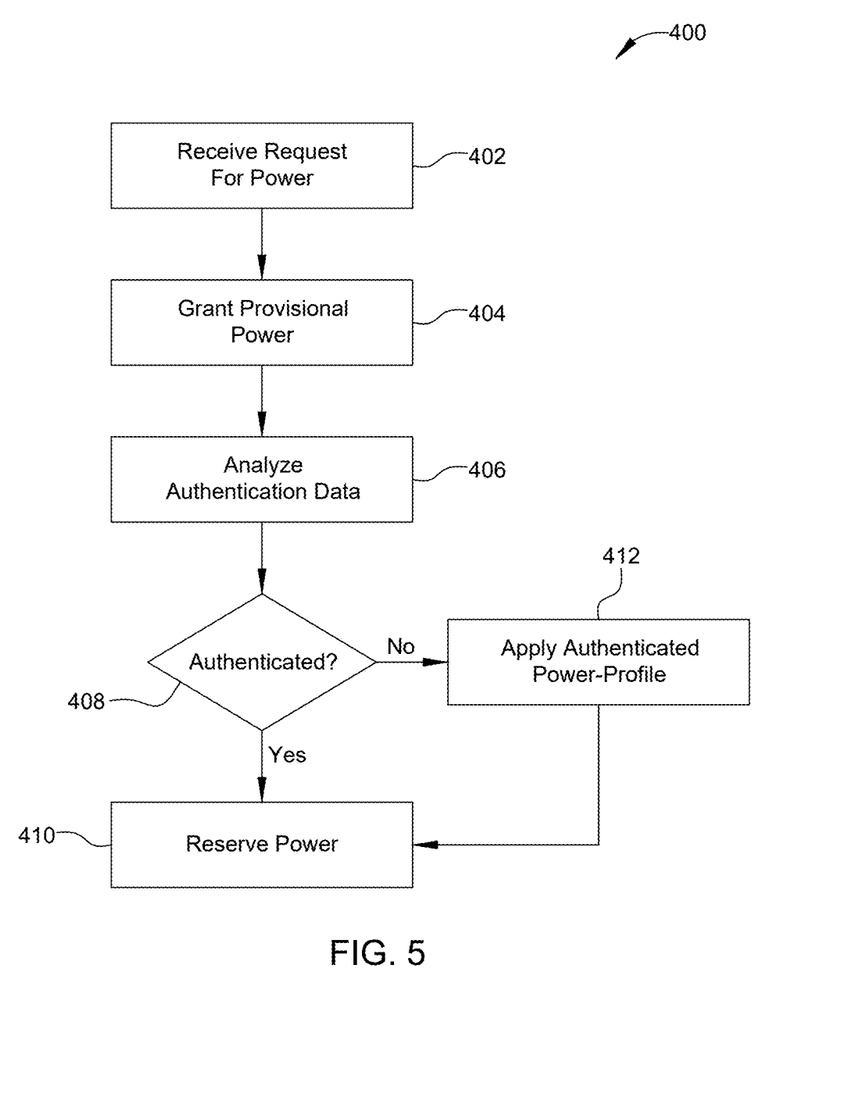
FIG. 5 is a flowchart illustrating an example authentication and power management method that may be performed in accordance with various embodiments.

With reference now to FIG. 5 and with continued reference to FIGS. 1-4, a process flowchart illustrating an example process 400 for authenticating a powered device (e.g., the PD 104) is shown in accordance with various embodiments. As can be appreciated in light of the disclosure, the order of operations performed by the process 400 is not limited to the sequential execution as illustrated in FIG. 5, but may be performed in one or more varying orders as applicable and in accordance with the present disclosure. In various embodiments, the process 400 can be scheduled to run based on one or more predetermined events or run automatically based on an occurrence of one or more events.

In one example, the process 400 may begin at operation 402 with receiving a request from a powered device for power to be supplied from power sourcing equipment to the powered device. For example, the PD 104 connected to an Ethernet port requests power. In response to the request, provisional power to the powered device is granted to the powered device at 404. In various embodiments, the provisional power grant does not result in a power reservation within a power budget of the power sourcing equipment. That is, the provisional power grant does not reduce the available power in the power budget of, for example, the PSE 112.

Authentication data for the powered device is analyzed at operation 406 in response to an authentication request received from the powered device to authenticate the powered device and reserve power within the power budget of the power sourcing equipment. For example, as described in more detail herein, the user data 204 and the device data 206 is analyzed to determine an authentication status for the powered device.

Based on the authentication status as successful or unsuccessful, a determination is made at operation 408 as to whether the powered device is authenticated. If the powered device is authenticated, power is reserved for the powered device at operation 410, which reduces the available power for the overall power budget of, for example, the PSE 112. For example, in response to the analysis determining that the authentication status for the powered device corresponds to a successful authentication, the reserved power reduces an available power in the power budget. In some embodiments, a power authentication is performed separate from a data transfer authentication using, respectively, the device data and the user data, wherein the power authentication confirms that the powered device is authorized to receive power from the power sourcing equipment and the data transfer authentication confirms that the powered device is authorized to transmit data traffic.

If the powered device is not authenticated (e.g., a non-authenticated PD 104), power to the powered device is denied and in various embodiments the authenticated-power-profile 210 is applied at operation 412 as described in more detail herein. For example, the authenticated-power-profile 210 is used to determine one or more actions to be performed with respect to the powered device having the failed authentication (e.g., a failed authentication for the powered device comprising an authorized device with a non-authorized user), which occurs in some examples in response to a defined number of failed authentications or an expiration of a timeout period defining an amount of time allowed to authenticate the powered device. In some embodiments, the defined number of failed authentications or the expiration of a timeout period defining an amount of time allowed to authenticate the powered device is determined after a first authentication failure of the powered device. That is, the authenticated-power-profile 210 is applied after a first authentication failure of the powered device connected to the Ethernet port (e.g., the powered device is connected to an Ethernet port configured to receive power from the power sourcing equipment and the authentication status for the powered device corresponds to a failed authentication of the powered device being offline with no user login).

The one or more actions include a power deny for a defined power deny period or a revocable power grant that results in power being reserved at operation 410 for the powered device until the power budget exceeds a maximum power supply limit for the power sourcing equipment in some examples as described in more detail herein. In some embodiments, the authenticated-power-profile comprises dynamically configurable criteria or parameters that are adjusted based on an overall power management strategy for the PSE 112. In some examples, additional or different criteria or parameters can be used. For example, the device data can include priority data for the powered device corresponding to one or more of a device classification, a device priority level, or a device class, and wherein determining the one or more actions is based at least in part on the priority data.

Thus, one or more embodiments provide improved authentication for supplying device power, including using the authenticated-power-profile in some examples.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for power authentication, the method comprising:
   receiving, by a processor at a network device, a request from a powered device for power to be supplied from power sourcing equipment to the powered device;
   granting, by the processor at the network device, in response to the request, provisional power to the powered device, wherein the provisional power grant does not result in a power reservation within a power budget of the power sourcing equipment;
   receiving, by the processor at the network device, an authentication request from the powered device to authenticate the powered device and reserve power within the power budget of the power sourcing equipment;
   analyzing, by the processor at the network device, user data and device data to determine an authentication status for the powered device;
   denying power within the power budget for the powered device, by the processor at the network device, in response to the analyzing determining that the authentication status for the powered device corresponds to a failed authentication; and
   using, by the processor at the network device, an authenticated-power-profile to determine one or more actions to be performed with respect to the powered device having the failed authentication, in response to a defined number of failed authentications or an expiration of a timeout period defining an amount of time allowed to authenticate the powered device, wherein the one or more actions include a power deny for a defined power deny period or a revocable power grant that results in power being reserved for the powered device until the power budget exceeds a maximum power supply limit for the power sourcing equipment.

2. The method of claim 1, wherein the failed authentication for the powered device comprises an authorized device with a non-authorized user.

3. The method of claim 1, wherein the authenticated-power-profile comprises dynamically configurable criteria or parameters that are adjusted based on an overall power management strategy for the power sourcing equipment.

4. The method of claim 1, wherein the defined number of failed authentications or the expiration of a timeout period defining an amount of time allowed to authenticate the powered device is determined after a first authentication failure of the powered device.

5. The method of claim 1, wherein the device data comprises priority data for the powered device corresponding to one or more of a device classification, a device priority level, or a device class, and wherein determining the one or more actions is based at least in part on the priority data.

6. The method of claim 1, further comprising performing a power authentication separate from a data transfer authentication using, respectively, the device data and the user data, wherein the power authentication confirms that the powered device is authorized to receive power from the power sourcing equipment and the data transfer authentication confirms that the powered device is authorized to transmit data traffic.

7. The method of claim 1, wherein the powered device is connected to an Ethernet port configured to receive power from the power sourcing equipment and the authentication status for the powered device corresponds to a failed authentication of the powered device being offline with no user login.

8. The method of claim 1, further comprising reserving power within the power budget for the powered device, by the processor at the network device, in response to the analyzing determining that the authentication status for the powered device corresponds to a successful authentication, the reserved power reducing an available power in the power budget.

9. A system for power authentication, comprising:
one or more processors; and
a tangible computer-readable storage medium storing instructions which, when executed by the one or more processors, cause the one or more processors to:
receive, by a processor at a network device, a request from a powered device for power to be supplied from power sourcing equipment to the powered device;
grant, by the processor at the network device, in response to the request, provisional power to the powered device, wherein the provisional power grant does not result in a power reservation within a power budget of the power sourcing equipment;
receive, by the processor at the network device, an authentication request from the power device to authenticate the powered device and reserve power within the power budget of the power sourcing equipment;
analyze, by the processor at the network device, user data and device data to determine an authentication status for the powered device;
deny power within the power budget for the powered device, by the processor at the network device, in response to the analyzing determining that the authentication status for the powered device corresponds to a failed authentication; and
use, by the processor at the network device, an authenticated-power-profile to determine one or more actions to be performed with respect to the powered device having the failed authentication, in response to a defined number of failed authentications or an expiration of a timeout period defining an amount of time allowed to authenticate the powered device, wherein the one or more actions include a power deny for a defined power deny period or a revocable power grant that results in power being reserved for the powered device until the power budget exceeds a maximum power supply limit for the power sourcing equipment.

10. The system of claim 9, wherein the failed authentication for the powered device comprises an authorized device with a non-authorized user.

11. The system of claim 9, wherein the authenticated-power-profile comprises dynamically configurable criteria or parameters that are adjusted based on an overall power management strategy for the power sourcing equipment.

12. The system of claim 9, wherein the defined number of failed authentications or the expiration of a timeout period defining an amount of time allowed to authenticate the powered device is determined after a first authentication failure of the powered device.

13. The system of claim 9, wherein the device data comprises priority data for the powered device corresponding to one or more of a device classification, a device priority level, or a device class, and wherein determining the one or more actions is based at least in part on the priority data.

14. The system of claim 9, wherein the tangible computer-readable storage medium is further configured to store instructions which, when executed by the one or more processors, cause the one or more processors to perform a power authentication separate from a data transfer authentication using, respectively, the device data and the user data, wherein the power authentication confirms that the powered device is authorized to receive power from the power sourcing equipment and the data transfer authentication confirms that the powered device is authorized to transmit data traffic.

15. The system of claim 9, wherein the powered device is connected to an Ethernet port configured to receive power from the power sourcing equipment and the authentication status for the powered device corresponds to a failed authentication of the powered device being offline with no user login.

16. The system of claim 9, wherein the tangible computer-readable storage medium is further configured to store instructions which, when executed by the one or more processors, cause the one or more processors to reserve power within the power budget for the powered device, by the processor at the network device, in response to the analyzing determining that the authentication status for the powered device corresponds to a successful authentication, the reserved power reducing an available power in the power budget.

17. A computer-readable storage device storing instructions which, when executed by one or more processors, cause the one or more processors to:
receive, by a processor at a network device, a request from a powered device for power to be supplied from power sourcing equipment to the powered device;
grant, by the processor at the network device, in response to the request, provisional power to the powered device, wherein the provisional power grant does not result in a power reservation within a power budget of the power sourcing equipment;
receive, by the processor at the network device, an authentication request from the power device to authenticate the powered device and reserve power within the power budget of the power sourcing equipment;
analyze, by the processor at the network device, user data and device data to determine an authentication status for the powered device;
deny power within the power budget for the powered device, by the processor at the network device, in response to the analyzing determining that the authentication status for the powered device corresponds to a failed authentication; and use, by the processor at the network device, an authenticated-power-profile to determine one or more actions to be performed with respect to the powered device having the failed authentication, in response to a defined number of failed authentications or an expiration of a timeout period defining an amount of time allowed to authenticate the powered device, wherein the one or more actions include a power deny for a defined power deny period or a revocable power grant that results in power being reserved for the powered device until the power budget exceeds a maximum power supply limit for the power sourcing equipment.

18. The computer-readable storage device of claim 17, wherein the failed authentication for the powered device comprises an authorized device with a non-authorized user.

19. The computer-readable storage device of claim 17, wherein the authenticated-power-profile comprises dynamically configurable criteria or parameters that are adjusted based on an overall power management strategy for the power sourcing equipment.

20. The computer-readable storage device of claim 17, wherein the defined number of failed authentications or the expiration of a timeout period defining an amount of time allowed to authenticate the powered device is determined after a first authentication failure of the powered device.

* * * * *